United States Patent [19]
Takabe et al.

[11] Patent Number: 5,483,133
[45] Date of Patent: Jan. 9, 1996

[54] CONTROL SYSTEM FOR OPENING OR CLOSING AN OPENING-CLOSING MEMBER

[75] Inventors: Yasuhiro Takabe; Koji Ueda; Toshihiro Hara, all of Hiroshima, Japan

[73] Assignee: Mazda Motor Corporation, Hiroshima, Japan

[21] Appl. No.: 217,654

[22] Filed: Mar. 25, 1994

[30] Foreign Application Priority Data

Mar. 25, 1993 [JP] Japan .................................. 5-090646

[51] Int. Cl.⁶ .................................................. G05B 5/00
[52] U.S. Cl. .................................................. 318/466
[58] Field of Search ................................... 318/445, 434, 318/466, 458, 459, 265, 449

[56] References Cited

U.S. PATENT DOCUMENTS

| | | | |
|---|---|---|---|
| 4,855,653 | 8/1989 | Lemirande | 318/469 |
| 4,980,618 | 12/1990 | Milnes et al. | 318/466 |
| 5,166,586 | 11/1992 | Yaguchi | 318/434 |
| 5,334,876 | 8/1994 | Washeleski et al. | 318/469 |

*Primary Examiner*—William M. Shoop, Jr.
*Assistant Examiner*—Karen Masih
*Attorney, Agent, or Firm*—Sixbey, Friedman, Leedom & Ferguson; Gerald J. Ferguson, Jr.; Donald R. Studebaker

[57] ABSTRACT

A control system for opening or closing an opening-closing member when a foreign material is caught by the opening-closing member. The event that the opening-closing member catches the foreign material is decided on the basis of a driving state of a motor for driving the opening-closing member such as a power window. For example, the event that the event of catching the foreign material is decided when a driving acceleration or a driving velocity is less than a predetermined threshold X or Y, respectively. Each of the thresholds X and Y is set basically on the basis of the previous driving acceleration and velocity of the opening-closing member. The thresholds X and Y are corrected on the basis of a condition exerting an influence upon the driving state of the motor, for example, on the basis of a driving voltage or a resistance to a sliding movement of the opening-closing member.

13 Claims, 3 Drawing Sheets

CONTROL SYSTEM FOR OPENING OR CLOSING AN OPENING-CLOSING MEMBER

BACKGROUND OF THE INVENTION

1. Field of the Invention

The present invention relates to a control system for opening or closing an opening-closing member and, more particularly, to a control system for opening or closing an opening-closing member so adapted as to detect an event that a foreign material is caught between or by the opening-closing member such as a power window.

2. Description of the Related Art

An automotive vehicle is often provided with an opening-closing member such as a power window, a sun roof or a canvas top, which is arranged to be opened or closed by manual operations with switches. If a foreign material would be caught between or by the opening-closing member when the opening-closing member is being closed, the opening-closing member cannot be closed tightly so that the vehicle may not get started. When such a foreign material would be caught by the opening-closing member, safety measures should be taken by opening the opening-closing member or generating an alarm. At this end, the event that the foreign material has been caught by the opening-closing member should be detected.

Japanese Patent Unexamined Publication Kokai No. 61-21,288 proposes the technique for detecting the event of catching a foreign material, which utilizes an operation for detecting the magnitude of an electric current applied to a motor for driving an opening-closing member and a contact switch operable upon contact. This technique can detect the event of catching the foreign material with high accuracy by utilizing a phenomenon that an electric current applied to the motor increases to an extremely high level if the opening-closing member would catch the foreign material. If the foreign material would be caught by the opening-closing member, the electric current applied to the motor becomes high upon occurrence of the event and a difference in the electric current becomes also high, compared with the event in which the opening-closing member is closed normally. Whether the foreign material is caught by the opening-closing member can be determined by detecting the difference in the electric current from the magnitude of electric current under normal circumstances.

In order to accurately detect the event that the foreign material has been caught by utilizing the contact switch, a number of contact switches are required resulting in an increase in costs. Further, positions in which the contact switches are disposed may exert a great influence upon the accuracy of detecting the event of catching the foreign material.

SUMMARY OF THE INVENTION

Therefore, the object of the present invention is to provide a control system for opening or closing an opening-closing member so adapted as to accurately detect an event in which a foreign material is caught between or by the opening-closing member, merely by analyzing a driving state of a driving means for driving the opening-closing member.

In order to achieve the object, the present invention consists of a control system for opening or closing an opening-closing member, comprising:

a driving means for driving the opening-closing member;

a first detecting means for detecting a driving state of the driving means;

a second detecting means for detecting a status of a parameter exerting an influence upon the driving state of the driving means;

a memory means for storing a relationship between the driving state of the driving means and the parameter; and a decision means for making a decision to determine if the foreign material is caught between or by the opening-closing member, on the basis of a value detected by each of the first and second detecting means and the relationship therebetween.

As the parameter, there may be utilized a voltage to be supplied to the driving means or a resistance to a sliding movement of the opening-closing member.

The arrangement of the control system as described hereinabove can detect the event of catching the foreign material basically by determining the driving state of the driving means. Further, whether the foreign material is caught by the opening-closing member is decided by making reference to the parameter which exerts an influence upon the driving state of the driving means, thereby resulting in an increase in the accuracy of decision. In particular, as the parameter, there is utilized the voltage for driving the opening-closing member or the resistance to the sliding movement of the opening-closing member, thereby achieving a higher accuracy for detecting the event of catching the foreign material.

Other objects, features and advantages of the present invention will become apparent in the course of the description of the preferred embodiments, which follows, with reference to the accompanying drawings.

DESCRIPTION OF THE PREFERRED EMBODIMENTS

The present invention will be described more in detail with reference to the accompanying drawings.

Figure 1:
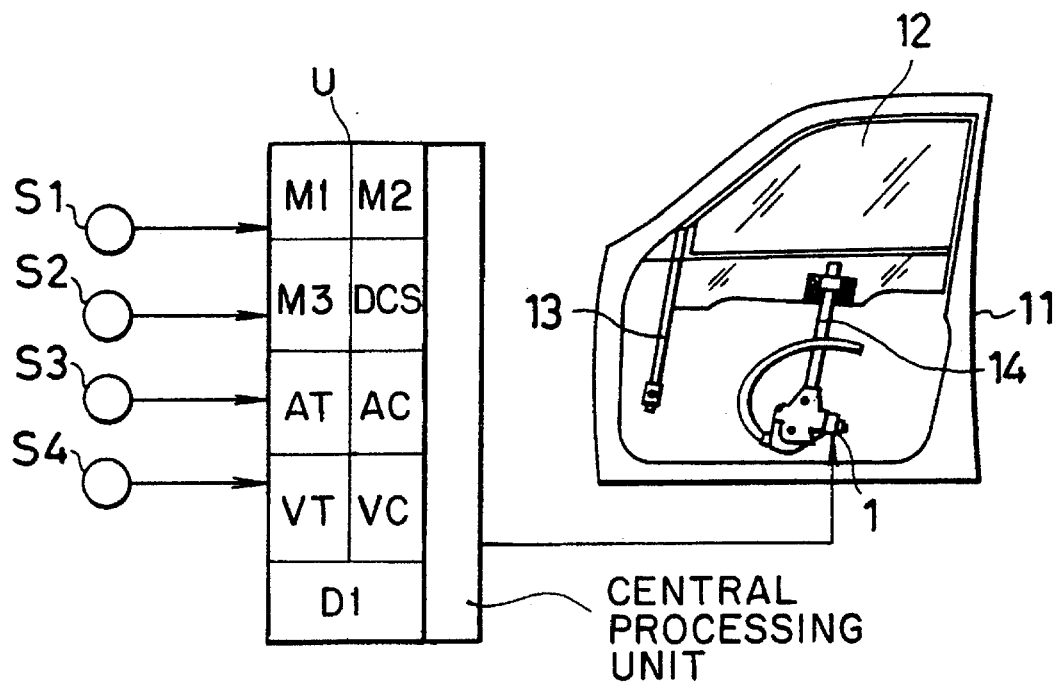
FIG. 1 is a schematic representation showing an outline of a control system according to an embodiment of the present invention.

As shown in FIG. 1, reference numeral 11 denotes a side door of a car, and reference numeral 12 denotes a power window (window glass) as a opening-closing member. The power window 12 is slidably mounted to the side door 11 through a guide 13 so as to be lifted or lowered. In this embodiment of the invention, the power window 12 is lifted or lowered by a motor 1 of a rotary type through a regulator 14.

The motor 1 is controlled by a control unit U comprised of a microcomputer and the control unit U is supplied with signals from switch S1 and sensors S2–S4. The controlling unit U in the form of a central processing unit includes a decision means D1; first, second and third memory means M1, M2 and M3, respectively; an acceleration threshold determining means AT; a velocity threshold determining means VT; a decision condition selecting means DCS; an acceleration correcting means AC and a velocity correction means VC. The function of each of these components will be described in greater detail hereinbelow.

The switch S1 is a manual switch through which an instruction is given to open or close the opening-closing member and which is arranged to select an instruction to open the opening-closing member or an instruction to close it. The sensor S2 is set to detect a rotational position of the motor 1 and is arranged to provide information for determining a rotational speed or a rotational acceleration of the motor 1. The sensor S3 is disposed for detecting the magnitude of voltage to be supplied to the motor 1. The sensor S4 is for detecting the temperature around or in the vicinity of the opening-closing member. In this embodiment, it is arranged to detect the ambient temperature.

The control unit U has a ROM having a memory of characteristic formulas as will be described hereinafter and a RAM having a memory of a voltage supplied to the motor 1 when the opening-closing member has previously been closed in a normal manner.

Figure 3:
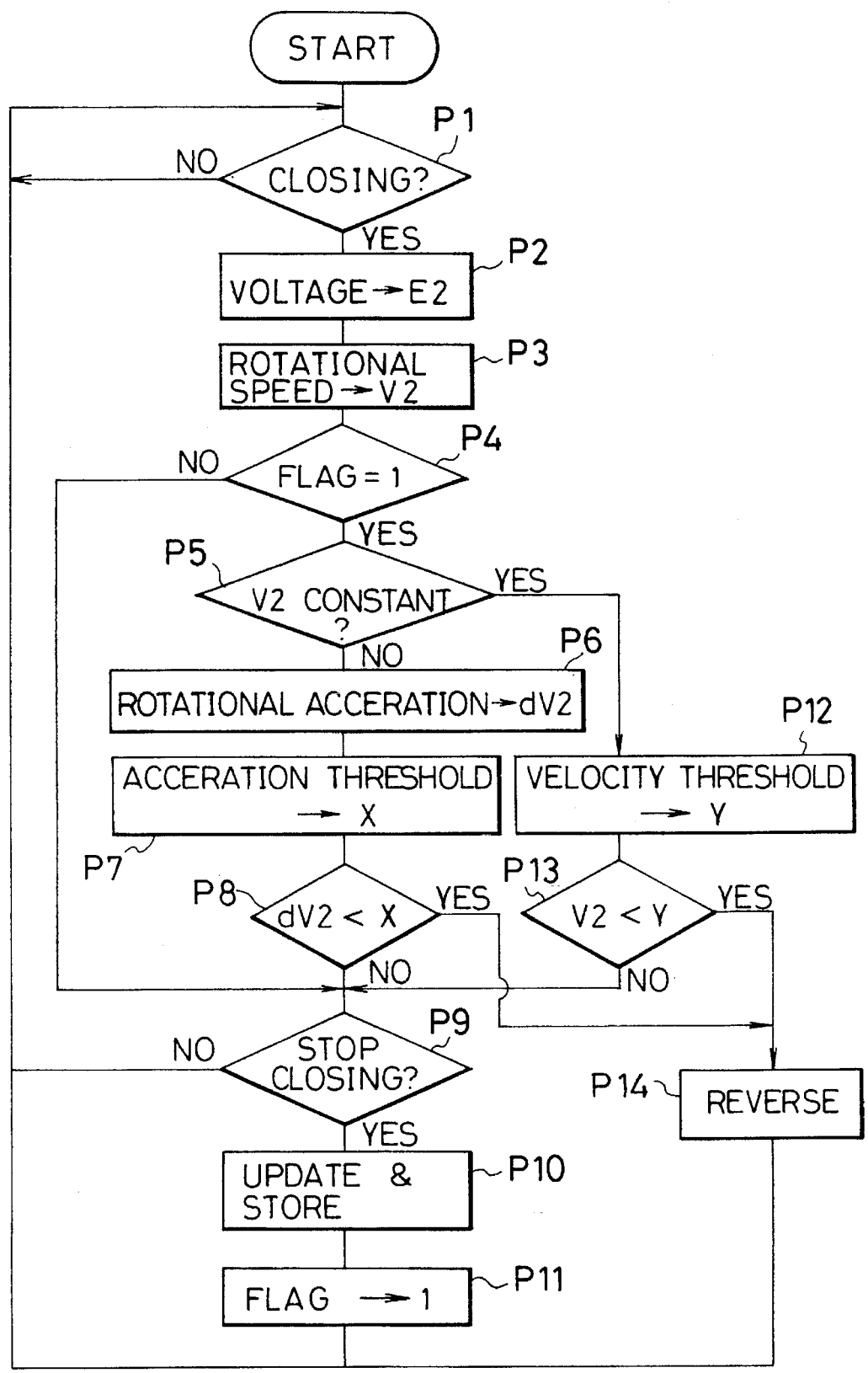
FIG. 3 is a flowchart showing an example of control implemented by the control system according to the present invention.

Now, a description will be made of the contents of the control by the control unit U with reference to FIG. 3.

First, at step P1, it is decided to determine if the switch S1 is in the process of closing the opening-closing member. When this decision indicates that the switch S1 is not operated, then this processing at step P1 is repeated. On the other hand, when it is decided at step P1 that the switch S1 is in the process of closing the opening-closing member, then the program flow goes to step P2 at which voltage is supplied to the motor 1 for closing the opening-closing member, starting the closing operation for closing the opening-closing member. At step P2, the voltage E2 supplied to the motor 1 is read, followed by proceeding to step P3 at which a rotational speed. V2 of the motor 1 is determined by differentiating the signal from the sensor S2.

Then, at step P4, it is decided to determine if the flag is set to 1. This flag is so arranged as to be set to 1 when it stores data on the previous closing operation for deciding the event of catching the foreign material. When this decision indicates that the flag is not set to 1, the situation at this time shows that no decision with respect to the event of catching the foreign material can be made. In this case, the program flow goes to step P9 at which it is further decided to determine if the closing operation by the switch S1 for closing the opening-closing member is ceased. When the decision at step P9 gives the negative result that the closing operation is not suspended, then the program flow is returned to step P1. On the other hand, when the result of the decision at step P9 indicates that the closing operation is ceased, then the program flow goes to step P10 at which the driving voltage E2 detected currently is updated and stored as previous value E1. At the same time, at step P10, a mean value of current driving velocities V2 is updated and stored as previous driving velocity V1, followed by updating and storing a mean value dV2 of the current driving acceleration V2 as previous driving acceleration dV1. Then, at step P11, the flag is set to 1, followed by the return to step P1.

When it is decided at step P4 that the flag is set to 1 after the return to step P1 from step P11, then the program flow goes to step P5 at which it is further decided to determine if the driving velocity V2 is constant, i.e. if the opening-closing member is being closed at a constant velocity.

Figure 2:
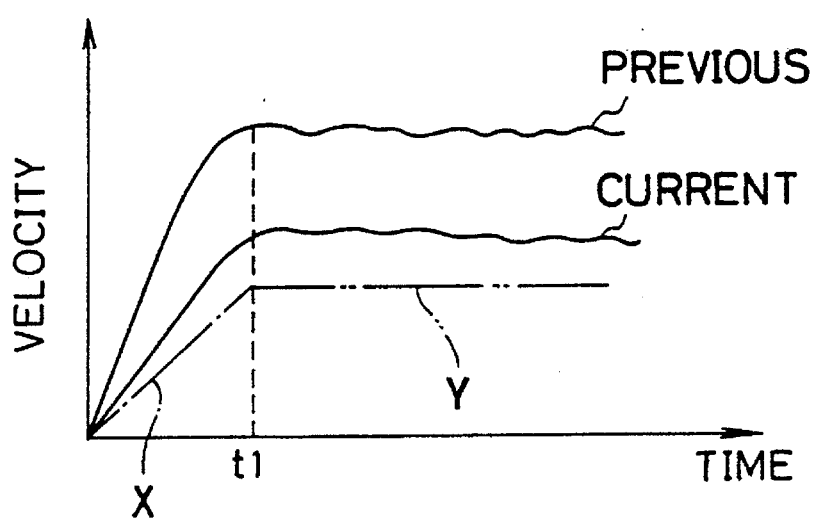
FIG. 2 is a graph showing modes in which velocities at which a motor is driven vary.

Specifically, as shown in FIG. 2, the velocity at which the opening-closing member is driven by the motor 1 varies as the motor 1 starts driving the opening-closing member. During a period of time from the start of the closing operation of the opening-closing member to time t1 (for example, 0.3 second), the driving velocities arise rapidly. This period of time is an initial stage of driving the opening-closing member by the motor 1. After the lapse of the time t1, the driving velocities are kept almost constant. Hence, in other words, the decision at step P5 is made to determine if the status of the closing operation is before the time t1 or after the time t1, as shown in FIG. 2.

When the decision at step P5 indicates that the velocity V2 is not constant, then the program flow goes to step P6 at which acceleration is selected as a parameter for deciding the event of catching the foreign material and a rotational acceleration dV2 is computed by differentiating the rotational acceleration V2, followed by proceeding to step P7 at which an acceleration threshold X is determined on the basis of the characteristic formula as will be described below. Then, at step P8, it is decided to determine if the current rotational acceleration dV2 for driving the opening-closing member is smaller than the acceleration threshold value X. When this decision gives the result that the current rotational acceleration dV2 for driving the opening-closing member is equal to or larger than the acceleration threshold value X, the situation at this time indicates that the opening-closing member is being closed in a normal manner without catching any foreign material so that the program flow goes to step P9. On the other hand, when it is decided at step P8 that the current rotational acceleration dV2 for driving the opening-closing member is smaller than the acceleration threshold value X, this situation indicates that a foreign material is caught by the opening-closing member. Hence, the program flow goes to step P14 at which the motor 1 is reversed to stop closing the opening-closing member and start opening it.

When it is decided at step P5 that the acceleration velocity V2 is constant, the situation indicates that the time t1 has elapsed since the start of closing the opening-closing member, as shown in FIG. 2. Hence, at step P12, a velocity threshold Y is determined on the basis of the characteristic formula as will be described below, followed by proceeding to step P13 at which it is decided to determine if the actual rotational velocity V2 is smaller than the velocity threshold Y. When this decision gives the result that the actual rotational velocity V2 is equal to or larger than the velocity threshold Y, then the program flow returns to step P1. On the other hand, when it is decided at step P13 that the actual rotational velocity V2 is smaller than the velocity threshold Y, the situation indicates that the opening-closing member catches a foreign material. Hence, at step P14, the closing movement of the opening-closing member is suspended and then the opening-closing member is opened.

Now, a description will be made of the characteristic formula for determining the acceleration threshold X at step P7 and the velocity threshold Y at step P12.

Figure 4:
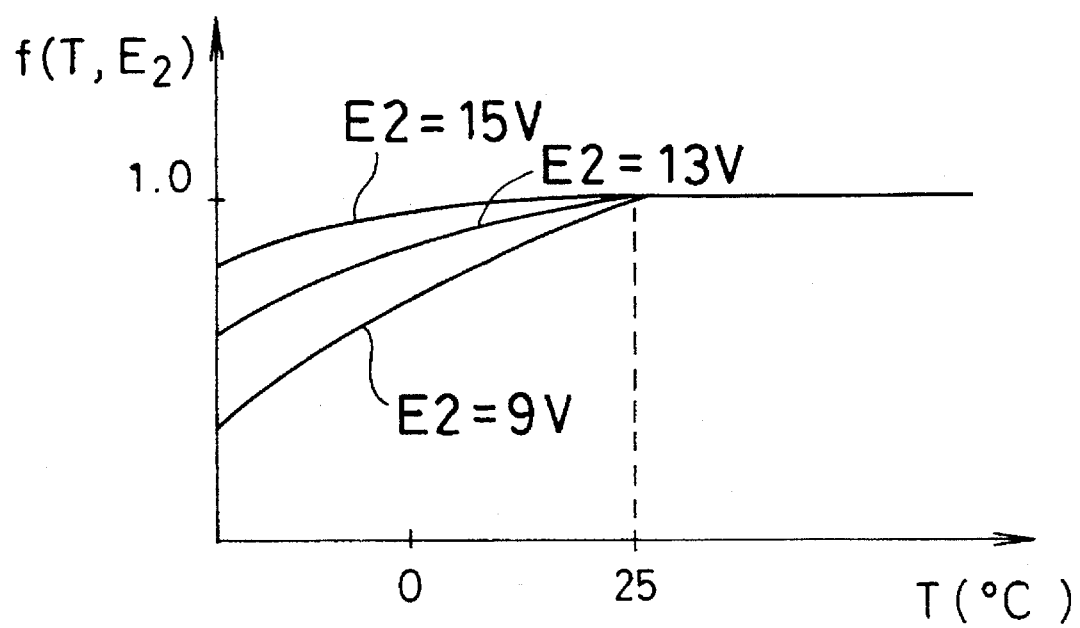
FIG. 4 is a graph showing characteristics of function f in a characteristic formula setting a threshold value.

In order to determine the acceleration threshold value X, a decrease rate dX at which the acceleration is decreasing is determined by the following formula:

$$dX = k1 \times (E1 - E2) \times f(T, E2)$$

where k1 is a correction coefficient based on a resistance to the sliding movement of the opening-closing member, which is experimentally determined for each opening-closing member;

E1 is the voltage supplied to the motor 1 when the opening-closing member has previously been closed normally (this value being stored at step P10);

E2 is the voltage supplied currently to the motor 1;

T is the ambient temperature sensed by the sensor S4; and f is the function as shown in FIG. 4.

More specifically, as shown in FIG. 4, the function f is arranged such that it is set to 1 because it is constant regardless of the voltage E2 when the ambient temperature T is 25° C. or higher and, on the other hand, it is set to become gradually smaller as the ambient temperature T becomes lower when the ambient temperature T is below 25° C. Further, the function f becomes smaller as the voltage E2 becomes smaller.

The acceleration threshold X can be computed by multiplying the decrease rate dX obtained above by the previous driving acceleration dV1 stored at step P10. In other words, the acceleration threshold X is computed by the formula as follows:

$$X = dX \times dV1$$

The above formula can be rewritten by the formula as follows:

$$X = \{k1 \times (E1-E2) \times f(T, E2)\} \times dV1$$

In other words, the characteristic formula for determining the acceleration threshold X is arranged to set the acceleration threshold X so as to be smaller to a predetermined value, for example, to 60%, of the previous driving acceleration dV1, when the driving condition at the previous time when the opening-closing member has previously been closed is the same as the condition at the current time when it is currently closed. This further means that, if the current driving acceleration dV2 would be as small as less than 60% of the previous driving acceleration dV1, it can be decided that a foreign material is caught by the opening-closing member. The characteristic formula as described hereinabove is employed so as to allow a value corresponding to a variation in the driving condition (driving voltage, resistance to sliding movement, and temperature) to comply with this 60% value.

Likewise, the velocity threshold Y for the driving velocity Y can be set in substantially the same manner as the acceleration threshold X and it can be computed by the formula as follows:

$$Y = \{k1 \times (E1-E2) \times f(T, E2)\} \times V1$$

A duplicate description on this formula will be omitted from the specification for brevity of explanation.

The foregoing description is made on the working example of this invention. It should be understood, however, that the invention is not limited to those described above by way of examples and it encompasses any modifications and variations, as will be described below, within the spirit and scope of this invention.

1. The flag may be arranged so as to be cleared to zero whenever an ignition switch is turned on or off. Further, the flag may be set to a normal value to be stored at step P10, by closing the opening-closing member under normal conditions before delivery from a plant, and thereafter it may be kept at 1 regardless of the ignition switch being turned on or off.

2. The event that the opening-closing member is fully closed may be detected by conventional techniques, for example, by detecting a phenomenon that the electric current supplied to the motor 1 becomes excessive or by detecting the result of monitoring the rotational position of the motor 1.

3. The temperature T functioning as a parameter of the function f may be set as a difference between the ambient temperature at which the opening-closing member has previously been closed and the ambient temperature at which it is currently closed. This setting is preferred particularly when the currently closing operation is executed after a considerably long time since the opening-closing member has previously been closed and the ambient temperature has varied to a remarkable extent.

4. The motor 1 may be of a reciprocating type.

What is claimed is:

1. A control system for opening or closing an opening-closing member, comprising:

a driving means for driving said opening-closing member;

a first detecting means for detecting a driving acceleration of said driving means and generating a first signal indicative of the driving acceleration;

a second detecting means for detecting a driving voltage of said driving means and generating a second signal indicative of the driving voltage;

a first memory means for receiving said signals and for storing a correlation between said driving acceleration and said driving voltage based on said signals;

a second memory means for storing a previous driving voltage supplied to said driving means;

an acceleration threshold determining means for determining an acceleration threshold as a function of said previous driving voltage stored by said second memory means, a current driving voltage detected by said second detecting means and said correlation stored by said first memory means; and a decision means for deciding whether said opening-closing member has encountered a foreign material as a function of said driving acceleration detected by said first detecting means and said acceleration threshold.

2. A control system for opening or closing an opening-closing member, comprising:

a driving means for driving said opening-closing member;

a first detecting means for detecting a driving velocity of said driving means and generating a first signal indicative of the driving velocity;

a second detecting means for detecting a driving voltage of said driving means and generating a second signal indicative of the driving voltage;

a first memory means for receiving said signals and for storing a correlation between said driving velocity and said driving voltage based on said signals;

a second memory means for storing a previous driving voltage supplied to said driving means;

a velocity threshold determining means for determining a velocity threshold as a function of said previous driving voltage stored by said second memory means, a current driving voltage detected by said second detecting means and said correlation stored by said first memory means; and a decision means for deciding whether said opening-closing member has encountered a foreign material as a function of said driving velocity detected by said first detecting means and said velocity threshold.

3. A control system for opening or closing an opening-closing member, comprising:

a driving means for driving said opening-closing member;

a first detecting means for detecting a driving acceleration of said driving means and generating a first signal indicative of the driving acceleration;

a second detecting means for detecting a driving voltage of said driving means and generating a second signal indicative of the driving voltage;

a third detecting means for detecting a driving velocity of said driving means and generating a third signal indicative of the driving voltage;

a first memory means for receiving said signals and for storing a correlation between said driving acceleration and said driving voltage based on said signals;

a second memory means for storing a previous driving voltage supplied to said driving means;

a third memory means for storing a correlation between said driving velocity and said driving voltage;

a first threshold determining means for determining an acceleration threshold as a function of said previous driving voltage stored by said second memory means, a current driving voltage detected by said second detecting means and said correlation stored by said first memory means;

a first decision means for deciding whether said opening-closing member has encountered a foreign material as a function of said driving acceleration detected by said first detecting means and said acceleration threshold;

a second threshold determining means for determining a velocity threshold as a function of said previous driving voltage stored by said second memory means, said current driving voltage detected by said second detecting means, and said correlation stored by said third memory means;

a second decision means for deciding whether said opening-closing member has encountered the foreign material as a function of said driving velocity detected by said third detecting means and said velocity threshold; and a decision condition selecting means for making a decision by said first decision means when said driving velocity detected by said third detecting means is not constant and for making a decision by said second decision means when said driving velocity is constant.

4. A control system as claimed in claim 1, further comprising:

an ambient temperature detecting means for detecting an ambient temperature and generating a third signal indicative of the ambient temperature; and an acceleration threshold correction means for receiving said third signal and varying said acceleration threshold as a function of the ambient temperature detected by said ambient temperature detecting means.

5. A control system as claimed in claim 2, further comprising:

an ambient temperature detecting means for detecting an ambient temperature and generating a third signal indicative of said ambient temperature; and a velocity threshold correction means for receiving said third signal and varying said velocity threshold as a function of the ambient temperature detected by said ambient temperature detecting means.

6. A control system as claimed in claim 3, further comprising:

an ambient temperature detecting means for detecting an ambient temperature and generating a fourth signal indicative of the ambient temperature;

an acceleration threshold correction means for receiving said fourth signal varying said acceleration threshold as a function of the ambient temperature detected by said ambient temperature detecting means; and a velocity threshold correction means for receiving said fourth signal and varying said velocity threshold as a function of the ambient temperature detected by said ambient temperature detecting means.

7. A control system as claimed in claim 4, wherein said acceleration threshold X is computed by formula as follows:

$$X=\{k1\times(E1-E2)\times f(T, E2)\}\times dV1$$

where k1 is a correction coefficient in accordance with a resistance to the sliding movement of the opening-closing member;

E1 is a previous driving voltage;

E2 is a current driving voltage;

T is an ambient temperature;

dV1 is a previous driving acceleration; and f is a function with T and E2 as parameters ($f \leq 1$).

8. A control system as claimed in claim 5, wherein said velocity threshold Y is computed by formula as follows:

$$Y=\{k1\times(E1-E2)\times f(T, E2)\}\times V1$$

where k1 is a correction coefficient in accordance with a resistance to the sliding movement of the opening-closing member;

E1 is a previous driving voltage;

E2 is a current driving voltage;

T is an ambient temperature;

V1 is a previous driving velocity; and f is a function with T and E2 as parameters ($f \leq 1$).

9. A control system as claimed in claim 6, wherein said acceleration threshold X and said velocity threshold Y are computed by formula as follows:

$$X=\{k1\times(E1-E2)\times f(T, E2)\}\times dV1$$

$$Y=\{k1\times(E1-E2)\times f(T, E2)\}\times V1$$

where k1 is a correction coefficient in accordance with a resistance to the sliding movement of the opening-closing member;

E1 is a previous driving voltage;

E2 is a current driving voltage;

T is an ambient temperature;

dV1 is a previous driving acceleration;

V1 is a previous driving velocity;

f is a function with T and E2 as parameters ($f \leq 1$).

10. A control system as claimed in any one of claims 1 to 3, wherein said opening-closing member is opened when it is decided by said decision means that the foreign material is encountered by said opening-closing member.

11. A control system as claimed in claim 1, further comprising a correction means for correcting said acceleration threshold value on the basis of a predetermined resistance to the sliding movement of the opening-closing member.

12. A control system as claimed in claim 2, further comprising a correction means for correcting said velocity threshold value on the basis of a predetermined resistance to the sliding movement of the opening-closing member.

13. A control system as claimed in claim 3, further comprising:

a first correction means for correcting said acceleration threshold value on the basis of a predetermined resistance to the sliding movement of the opening-closing member and;

a second correction means for correcting said velocity threshold value on the basis of a predetermined resistance to the sliding movement of the opening-closing member.

* * * * *